US011507256B2

(12) United States Patent
Adika et al.

(10) Patent No.: US 11,507,256 B2
(45) Date of Patent: Nov. 22, 2022

(54) UPDATING DATA RECORDS BY ADDING EDITING FUNCTIONS TO NON-EDITABLE DISPLAY ELEMENTS

(71) Applicant: Walkme Ltd., Tel Aviv (IL)

(72) Inventors: Dan Adika, Jerusalem (IL); Nir Nahum, Tel Aviv (IL); Roy Gilad, Rehovot (IL); Shlomi Dozetas, Tel Aviv (IL)

(73) Assignee: WALKME LTD., Tel Aviv (IL)

( * ) Notice: Subject to any disclaimer, the term of this patent is extended or adjusted under 35 U.S.C. 154(b) by 406 days.

(21) Appl. No.: 15/822,246

(22) Filed: Nov. 27, 2017

(65) Prior Publication Data

US 2018/0173386 A1 Jun. 21, 2018

Related U.S. Application Data

(60) Provisional application No. 62/434,529, filed on Dec. 15, 2016.

(51) Int. Cl.
*G06F 3/0484* (2022.01)
*G06F 8/38* (2018.01)
(Continued)

(52) U.S. Cl.
CPC .............. *G06F 3/0484* (2013.01); *G06F 8/38* (2013.01); *G06F 8/427* (2013.01); *G06F 16/955* (2019.01);
(Continued)

(58) Field of Classification Search
CPC .... G06F 3/0484; G06F 16/955; G06F 16/957; G06F 16/9577; G06F 8/38; G06F 8/427;
(Continued)

(56) References Cited

U.S. PATENT DOCUMENTS 7,216,292 B1 * 5/2007 Snapper ................ G06F 40/174
715/236
8,370,219 B1 * 2/2013 Prabhu .................... G06F 40/14
715/234
(Continued)

FOREIGN PATENT DOCUMENTS

CN         105117205 A      12/2015
WO   WO-2009108417 A1 *  9/2009  ........... G06F 16/972

OTHER PUBLICATIONS

Bill Scott & Theresa Neil, "Designing Web Interfaces", Published by O'Reilly in 2009 (Year: 2009).*
(Continued)

*Primary Examiner* — Reza Nabi
*Assistant Examiner* — Hwei-Min Lu
(74) *Attorney, Agent, or Firm* — Myers Wolin, LLC

(57) ABSTRACT

A computer implemented method of editing attributes of data records presented through GUI elements by a webpage. The method including the steps of: using one or more processors of a client terminal hosting a web browser for executing a code for parsing a webpage rendered by the web browser to extract identifier information of one or more GUI elements presented in the webpage, the GUI elements presenting a value of one or more attributes of a data record extracted from a database according to the identifier information. The GUI elements are presented in a non-editable area, identifying a user selection indicative of the GUI elements, rendering an editing GUI element for editing the value, extracting a user input received from a user using the editing GUI element and forwarding to a server hosting the webpage instructions to update the value in the data record according to the user input.

21 Claims, 7 Drawing Sheets

Figure 1:
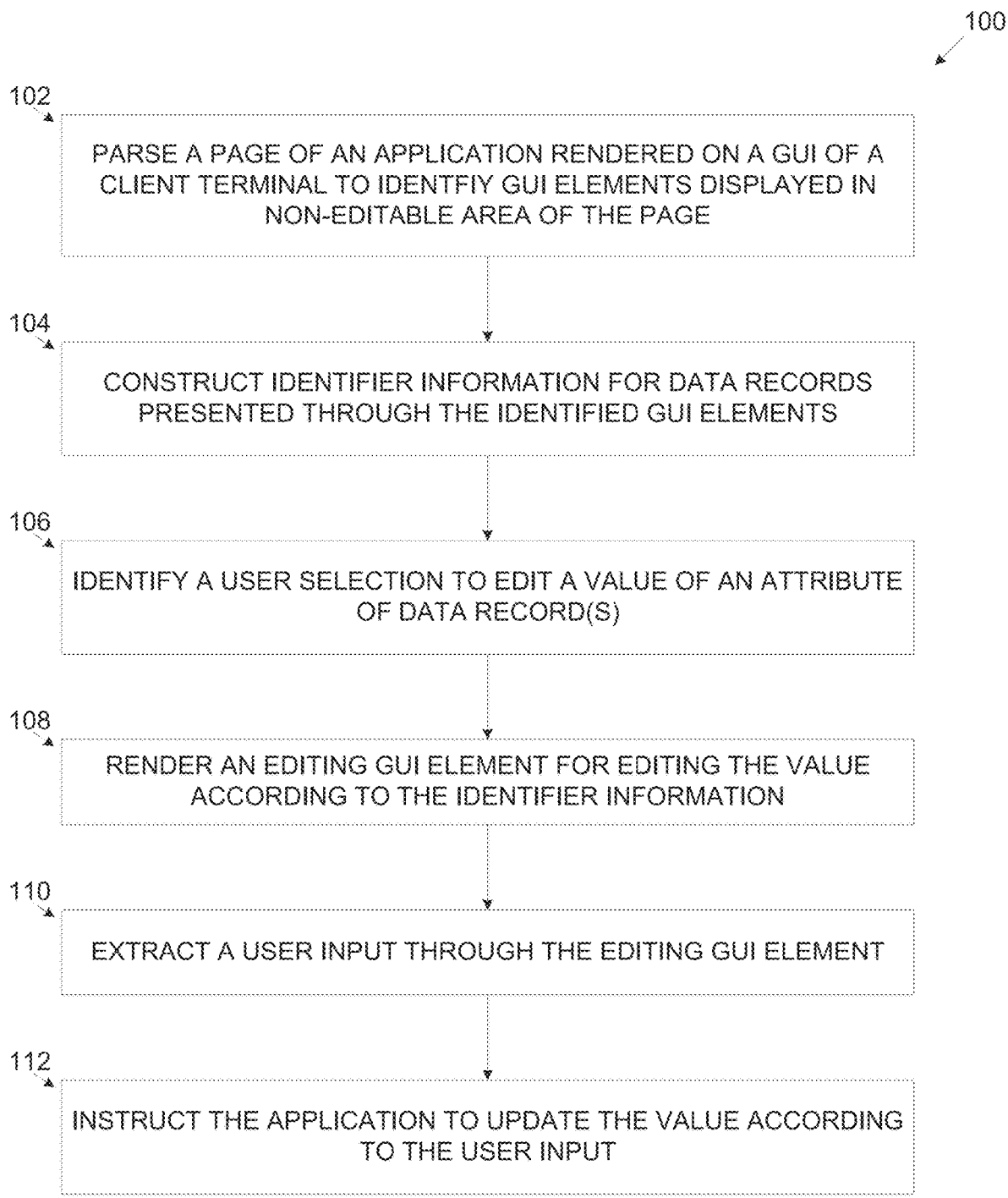

(51) Int. Cl.
    *G06F 16/955*     (2019.01)
    *G06F 16/957*     (2019.01)
    *G06F 8/41*     (2018.01)

(52) U.S. Cl.
    CPC ........ *G06F 16/957* (2019.01); *G06F 16/9577* (2019.01)

(58) Field of Classification Search
    CPC ............... G06F 17/2247; G06F 17/24; G06F 17/30876; G06F 17/3089
    USPC ............... 715/218, 220, 255, 790; 345/629
    See application file for complete search history.

(56) References Cited

U.S. PATENT DOCUMENTS

| | | | | |
|---|---|---|---|---|
| 9,864,735 | B1* | 1/2018 | Lamprecht | G06F 16/958 |
| 10,013,400 | B1* | 7/2018 | Zetlen | G06F 40/117 |
| 2004/0217985 | A9* | 11/2004 | Ries | G06F 40/166 |
| | | | | 715/740 |
| 2005/0234838 | A1* | 10/2005 | Manousos | G06Q 99/00 |
| | | | | 705/500 |
| 2005/0240869 | A1* | 10/2005 | Leetaru | G06F 40/166 |
| | | | | 715/255 |
| 2006/0129926 | A1* | 6/2006 | Malek | G06F 40/103 |
| | | | | 715/255 |
| 2006/0248442 | A1* | 11/2006 | Rosenstein | G06F 40/177 |
| | | | | 715/255 |
| 2008/0189682 | A1* | 8/2008 | Rude | G06F 40/10 |
| | | | | 717/113 |
| 2008/0307328 | A1* | 12/2008 | Hatcher | H04L 51/066 |
| | | | | 715/810 |
| 2009/0037845 | A1* | 2/2009 | Kao | G06F 40/166 |
| | | | | 715/823 |
| 2010/0241516 | A1* | 9/2010 | Kim | G06Q 30/0277 |
| | | | | 705/26.1 |
| 2012/0173963 | A1* | 7/2012 | Hoke | G06F 40/18 |
| | | | | 715/234 |
| 2014/0047321 | A1* | 2/2014 | Prabhu | G06F 40/14 |
| | | | | 715/234 |
| 2014/0195889 | A1 | 7/2014 | Hampton et al. | |
| 2014/0195892 | A1* | 7/2014 | Hampton | G06F 40/166 |
| | | | | 715/234 |
| 2015/0169518 | A1* | 6/2015 | Antipa | G06F 40/166 |
| | | | | 715/240 |
| 2016/0147641 | A1* | 5/2016 | Malla | G06F 11/3692 |
| | | | | 717/125 |
| 2017/0031887 | A1* | 2/2017 | Franczyk | G06F 16/958 |

OTHER PUBLICATIONS

Bill Scott & Theresa Neil, "Designing Web Interfaces—Principles and Patterns for Rich Interactions", published by O'Reilly Media Inc. in 2009 (Year: 2009).*

Parvez., "HTML5 Inline Editing with PHP, MYSQL & jQuery Ajax", Phpflow.com, 5 pages, Dec. 28, 2015.

Neil et al., "Designing web interfaces: In-page editing", Chapter 1, pp. 3-23, Jan. 29, 2009.

International Application # PCT/IB2017/057355 search report dated Mar. 9, 2018.

\* cited by examiner

UPDATING DATA RECORDS BY ADDING EDITING FUNCTIONS TO NON-EDITABLE DISPLAY ELEMENTS

CROSS-REFERENCE TO RELATED APPLICATION

This application claims the benefit of U.S. Provisional Patent Application 62/434,529, filed Dec. 15, 2016, which is incorporated herein by reference.

FIELD AND BACKGROUND OF THE INVENTION

The present invention, in some embodiments thereof, relates to editing attributes of data records presented by an application page through graphical user interface (GUI) elements and, more particularly, but not exclusively, to editing attributes of data records presented by an application page through GUI elements by providing a quick edit tool.

The complexity of everyday life, particularly in the field of resource management (for example, organizational resource management, financial resource management, project management, program management and/or the like), is constantly increasing.

In order to efficiently and effectively cope with this constantly increasing complexity, a plurality of management software tools, software products, platforms and systems were devised. These tools, products, platforms and systems are ever changing, evolving and becoming more complex in functionality and operability to address the needs stemming from the challenges presented by the modern resource management environment.

SUMMARY OF THE INVENTION

The present invention provides, in a first aspect, a computer-implemented method of editing attributes of data records presented through GUI elements by a webpage. This method can be carried out using one or more processors of a client terminal that is hosting a web browser. The web browser is used to execute code for the following:
Parsing a webpage rendered by the web browser to extract identifier information of one or more GUI elements presented in the webpage, the one or more GUI elements presenting a value of one or more attributes of a data record extracted from a database according to the identifier information; the one or more GUI elements are presented in a non-editable area.
Identifying a user selection indicative of the one or more GUI elements.
Rendering an Editing GUI element for editing the value.
Extracting a user input received from a user using the Editing GUI element.
Forwarding instructions to update the value in the data record according to the user input to a server hosting the webpage.
By enabling the user to edit the data record attribute(s) in the read-only area of the webpage (user context), the user may easily update the value of the attribute without navigating to additional webpage(s). This may allow for significant time saving and for manipulating the GUI elements presented by the application that may lead to increased user productivity.

According to a second aspect of the present invention there is provided a system for editing attributes of data records presented through GUI elements by a webpage, comprising using one or more processors of a client terminal for executing a code, the code comprising:
Code instructions to parse a webpage rendered by the web browser to extract identifier information of one or more GUI elements presented in the webpage, the one or more GUI elements presenting a value of one or more attributes of a data record extracted from a database according to the identifier information, the one or more GUI elements are presented in a non-editable area.
Code instructions to identify a user selection indicative of the one or more GUI elements;
Code instructions to render an editing GUI element for editing the value.
Code instructions to extract a user input received from a user using the editing GUI element.
Code instructions to forward to a server hosting the webpage instructions to update the value in the data record according to the user input.
By enabling the user to edit the data record attribute(s) in the read-only area of the webpage (user context), the user may easily update the value of the attribute without navigating to additional webpage(s). This may allow for significant time saving and for manipulating the GUI elements presented by the application that may lead to increased user productivity.

According to a third aspect of the present invention there is provided a computer implemented method of editing attributes of data records presented through GUI elements displayed by an application, comprising using one or more processors of a client terminal for executing a code for:
Parsing an application page displaying user context to extract identifier information of one or more GUI elements presented in the application page, the one or more GUI elements presenting a value of one or more attributes of a data record extracted from a database according to the identifier information, the one or more GUI elements is presented in a non-editable area.
Identifying a user selection indicative of the one or more GUI elements.
Rendering an editing GUI element for editing the value.
Extracting a user input received from a user using the editing GUI element.
Instructing the application to update the value in the data record according to the user input.
By enabling the user to edit the data record attribute(s) in the read-only area of the page (user context), the user may easily update the value of the attribute without navigating to additional page(s). This may allow for significant time saving and for manipulating the GUI elements presented by the application that may lead to increased user productivity.

With reference to the first, the second and/or the third aspects of the invention, according to a first implementation, the identifier information is extracted using an Application Programming Interface (API) of the application. This may allow extracting the identifier information by independently interacting with the application in a manner that is transparent to the user.

With reference to the first, the second and/or the third aspects of the invention, according to a second implementation, the identifier information is extracted by rendering one or more other pages loaded invisibly to the user on the GUI. This may allow extracting the identifier information by independently interacting with the application in a manner that is transparent to the user.

With reference to the first, the second and/or the third aspects of the invention, according to a third implementation, the identifier information is extracted according to pre-defined identifier information. This may allow extracting the identifier information with no redundant interaction with the application.

With reference to the first, the second and/or the third aspects of the invention and/or any of the previous implementations, according to a fourth implementation, the editing GUI element is rendered according to a permission attribute value indicating an access privilege value for the one or more attributes. By checking the access rights of the user, access to the data record may be restricted according to the privileges of the user(s).

With reference to the first, the second and/or the third aspects of the invention and/or any of the previous implementations, according to a fifth implementation, the instructions are forwarded to the server using an API of the application. This may allow instructing the application to update the value by independently interacting with the application in a manner that is transparent to the user.

With reference to the first, the second and/or the third aspects of the invention and/or any of the first, second, third and/or fourth implementations, according to a sixth implementation, the instructions are forwarded to the server by updating the value in one or more other pages loaded invisibly to the user on the GUI. This may allow instructing the application to update the value by independently interacting with the application in a manner that is transparent to the user.

With reference to the first, the second and/or the third aspects of the invention and/or any of the previous implementations, according to a seventh implementation, the one or more GUI elements are marked to indicate to the user that the attribute is editable. By prominently marking the GUI element(s) presenting the editable attribute(s), the user may become instantly aware of which attributes may be edited from the current user context (page). This may reduce and/or eliminate the need for the user to navigate to other one or more pages and/or webpages to explore the editing characteristics of the attribute(s).

Optionally, with reference to the first, the second and/or the third aspects of the invention and/or any of the previous implementations, according to an eighth implementation, a text inserted by the user using the editing GUI element is auto-completed. Autocompleting the text inserted by the user according to text identified in the page (user context) may allow the user to explore probable values without specifically accessing them.

Optionally, with reference to the first, the second and/or the third aspects of the invention and/or any of the previous implementations, according to a ninth implementation, a completion indication is presented to the user after the instructions are forward to the server. Informing the user of completion of the editing operation may allow the user to verify his editing operation has successfully completed. Also, in case the completion indication is not presented the user may take further action, for example, repeating the editing operation.

Optionally, with reference to the first, the second and/or the third aspects of the invention and/or any of the previous implementations, according to a tenth implementation, the one or more GUI elements are marked in case the value of the one or more attributes complies with one or more conditional rules. By prominently marking the respective GUI element(s), the user may become instantly aware of attribute(s) which comply with one or more of the conditional rules, for example, share similar values, exceed a certain threshold and/or the like.

Optionally, with reference to the first, the second and/or the third aspects of the invention and/or any of the previous implementations, according to an eleventh implementation, the editing GUI element is rendered to receive the user input for editing the value of the one or more attributes for multiple data records such as the data record presented by respective GUI elements in the webpage. Editing the value for a plurality of data records may result in significant time savings compared to adjusting the value of each data record individually.

Optionally, with reference to the first, the second and/or the third aspects of the invention and/or any of the previous implementations, according to a twelfth implementation, the editing GUI element comprises a restore field for restoring the updated value to the value as set prior to the edit. The value as set prior to the edit is stored in an event log. Providing the restore option may allow the user to restore the value to its state before the editing operation instead of re-editing the value to adjust the value to its previous settings. This may be of even more significance in case pre-edit values need to be restored for multiple attributes and/or data records.

Optionally, with reference to the first, the second and/or the third aspects of the invention and/or any of the previous implementations, according to a thirteenth implementation, the editing GUI element comprises a delete field for deleting the data record in case the identifier information identifies the data record as allowed for deletion. Providing the delete option may allow the user to delete the entire data record from the current user context (page and/or webpage) without navigating to other page(s) and/or webpage(s) to perform the data record delete operation.

Optionally, with reference to the first, the second and/or the third aspects of the invention and/or any of the previous implementations, according to another implementation, the editing GUI element comprises a duplicate field for duplicating the data record in case the identifier information identifies the data record as allowed for duplication. Providing the duplicate option may allow the user to duplicate the data record from the current user context (page and/or webpage) without navigating to other page(s) and/or webpage(s) to perform the data record duplication operation.

Optionally, with reference to the first, the second and/or the third aspects of the invention and/or any of the previous implementations, according to a fourteenth implementation, the Editing GUI element comprises an add-field for adding a new data record such as the data record in case the identifier information identifies that the new data record is allowed to be added. Providing the add option may allow the user to add a data record similar to the data record associated with the selected GUI element from the current user context (page and/or webpage) without navigating to other page(s) and/or webpage(s) to perform the data record add operation.

Optionally, with reference to the first, the second and/or the third aspects of the invention and/or any of the previous implementations, according to a fifteenth implementation, the Editing GUI element presents additional information for the data record in response to one or more additional actions of the user interaction. Presenting the additional information of the data record may allow the user to instantly explore the data record and/or its attributes from the current user context (page and/or webpage) without navigating to other page(s) and/or webpage(s) to retrieve the additional information.

With reference to the third aspect of the invention, according to a sixteenth implementation, the application is a member of a group consisting of the following: a local application executed by the client terminal, and a web application executed by a remote server accessible from the client terminal over one or more networks. The user may quickly edit, adjust and/or manipulate data records and/or their attributes for either local applications and/or web based applications.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

Figure 2A:
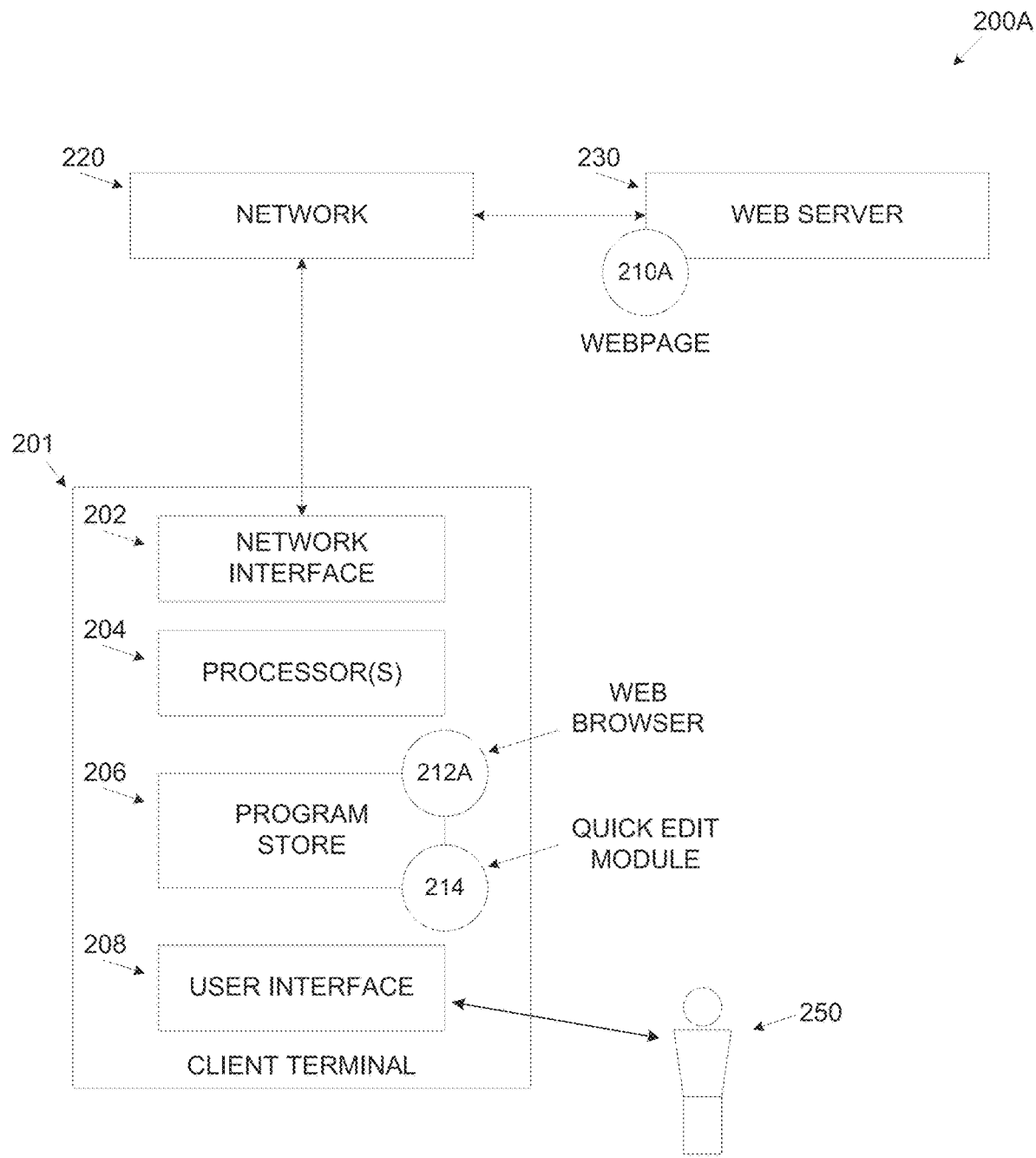
Figure 2B:
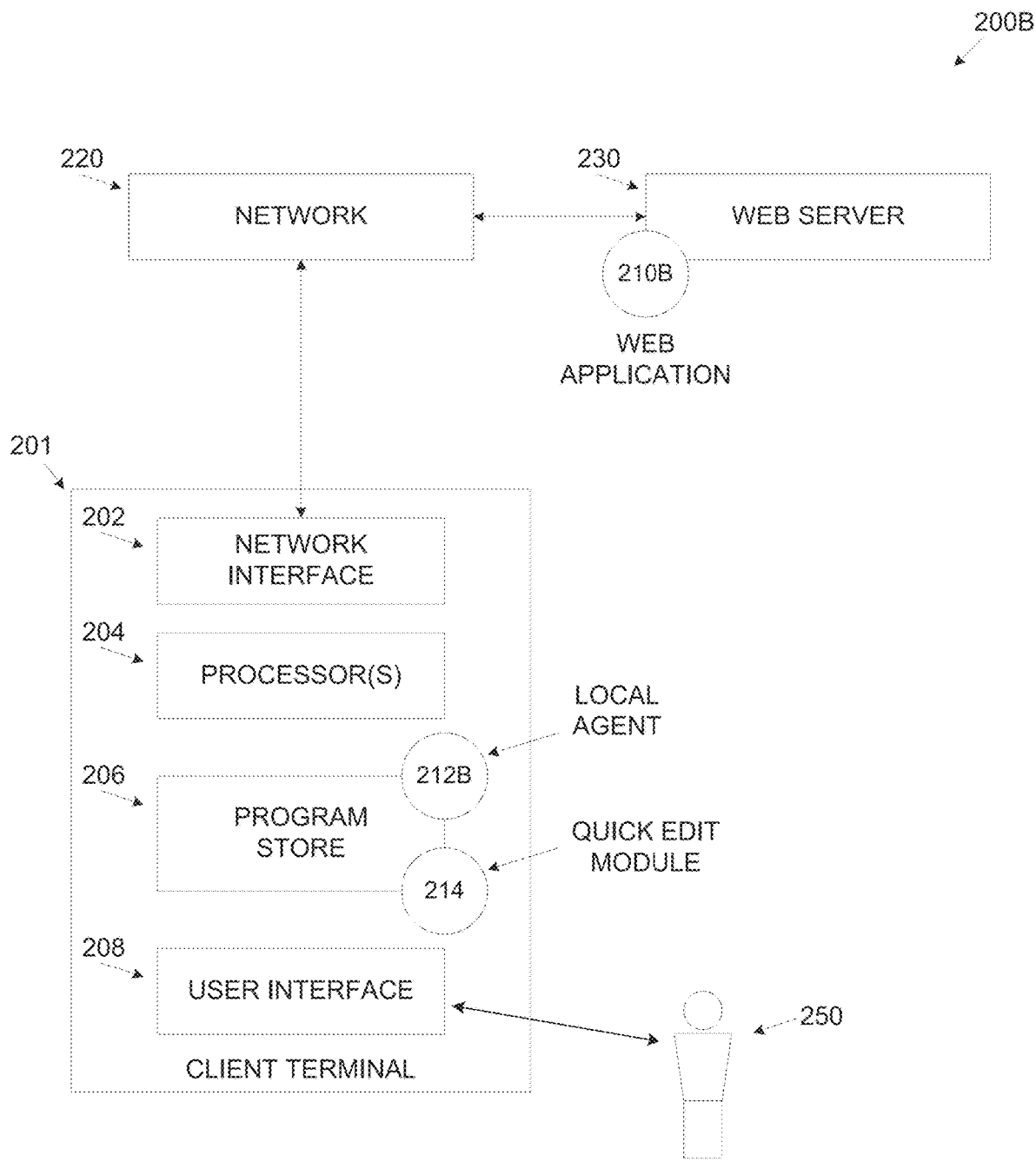
Figure 2C:
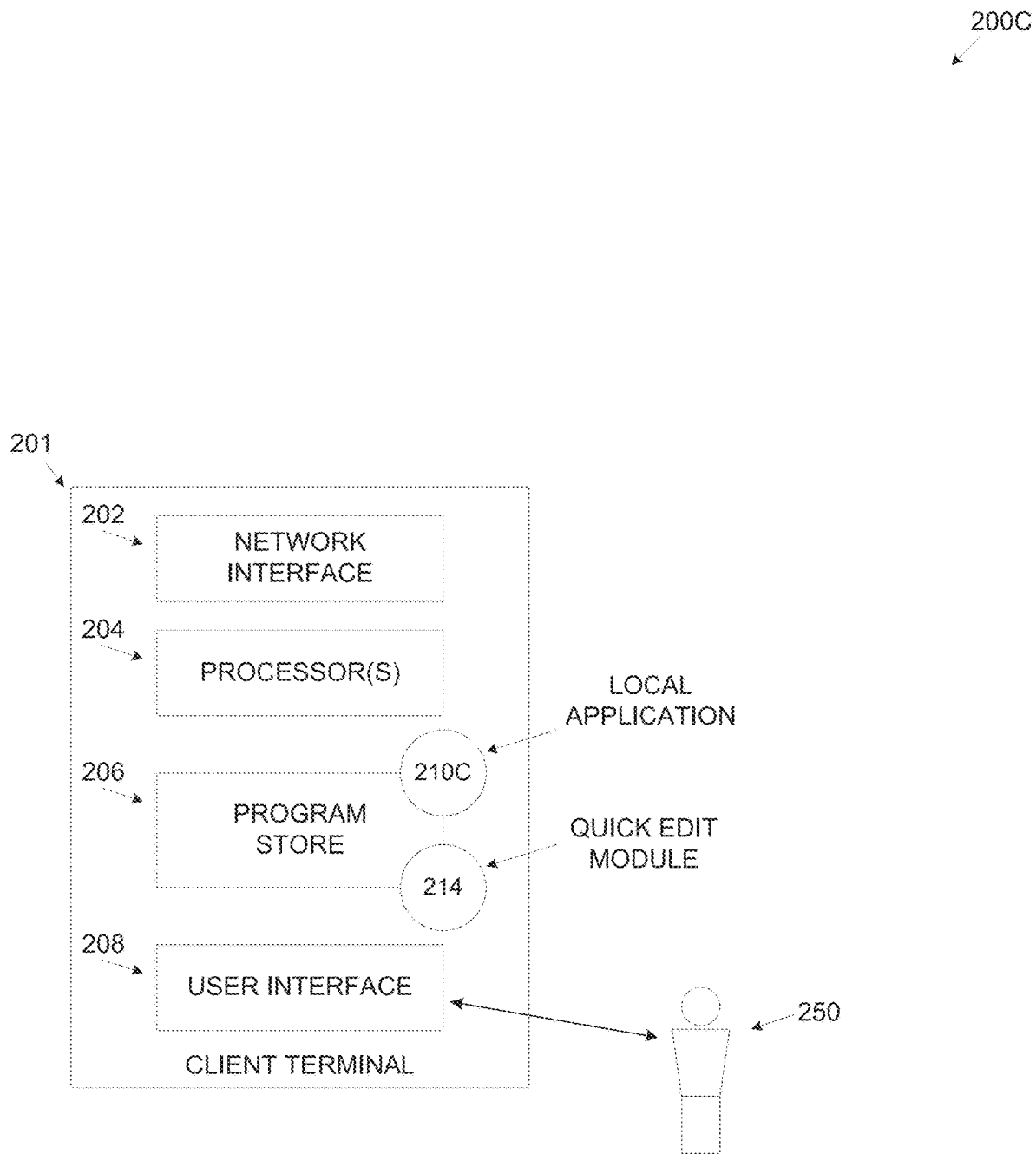
Figure 3A:
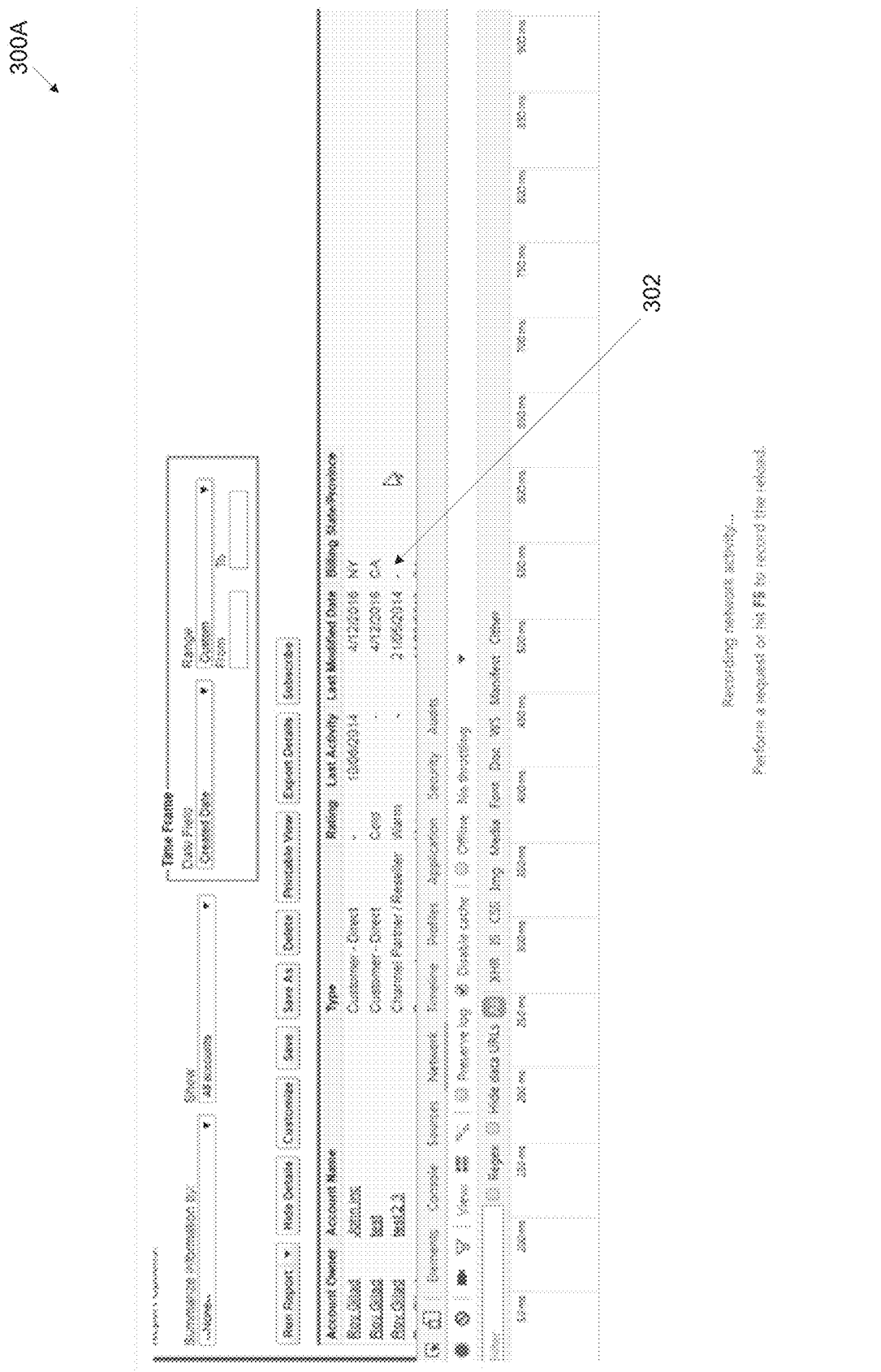
Figure 3B:
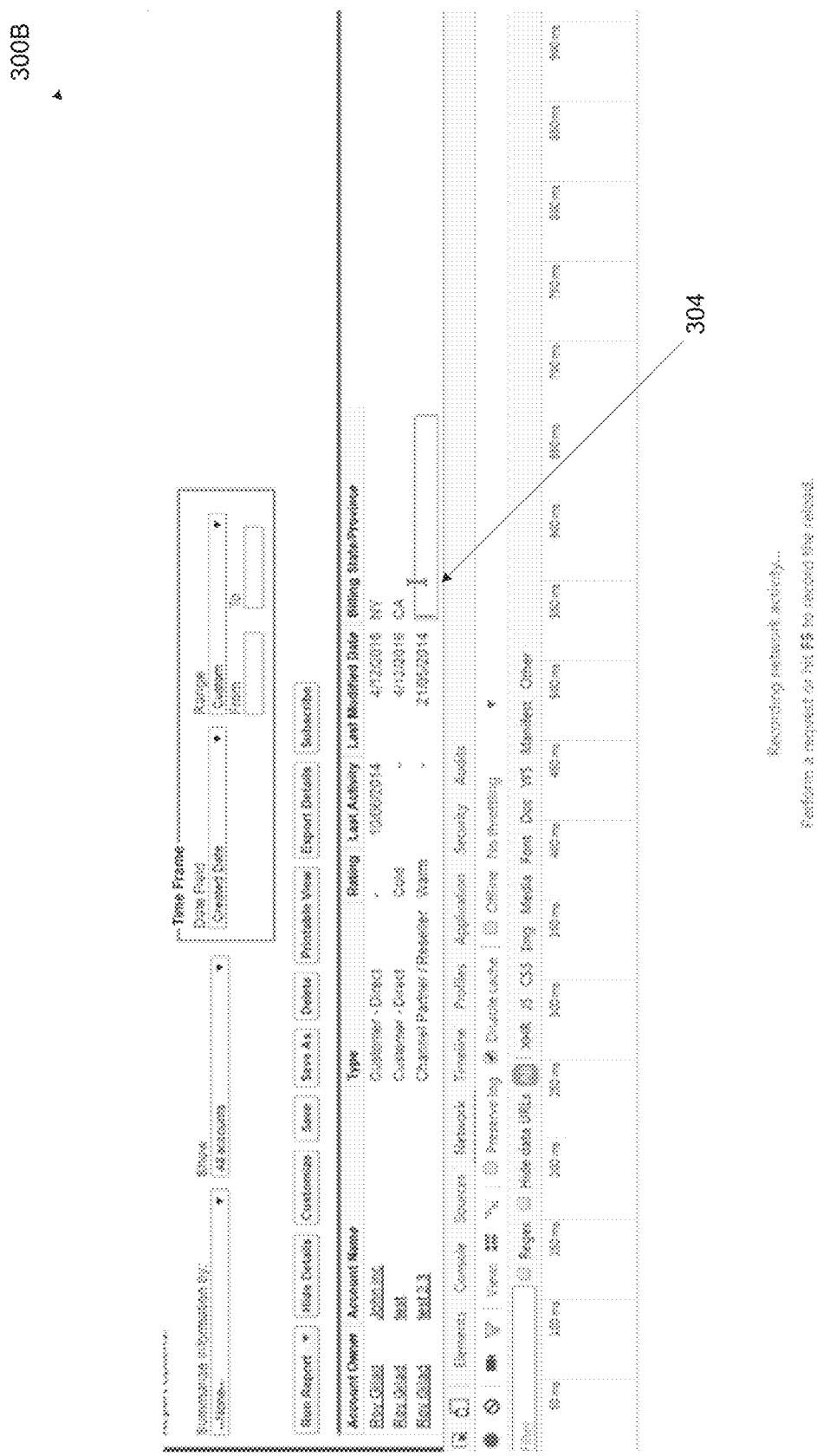
Figure 3C:
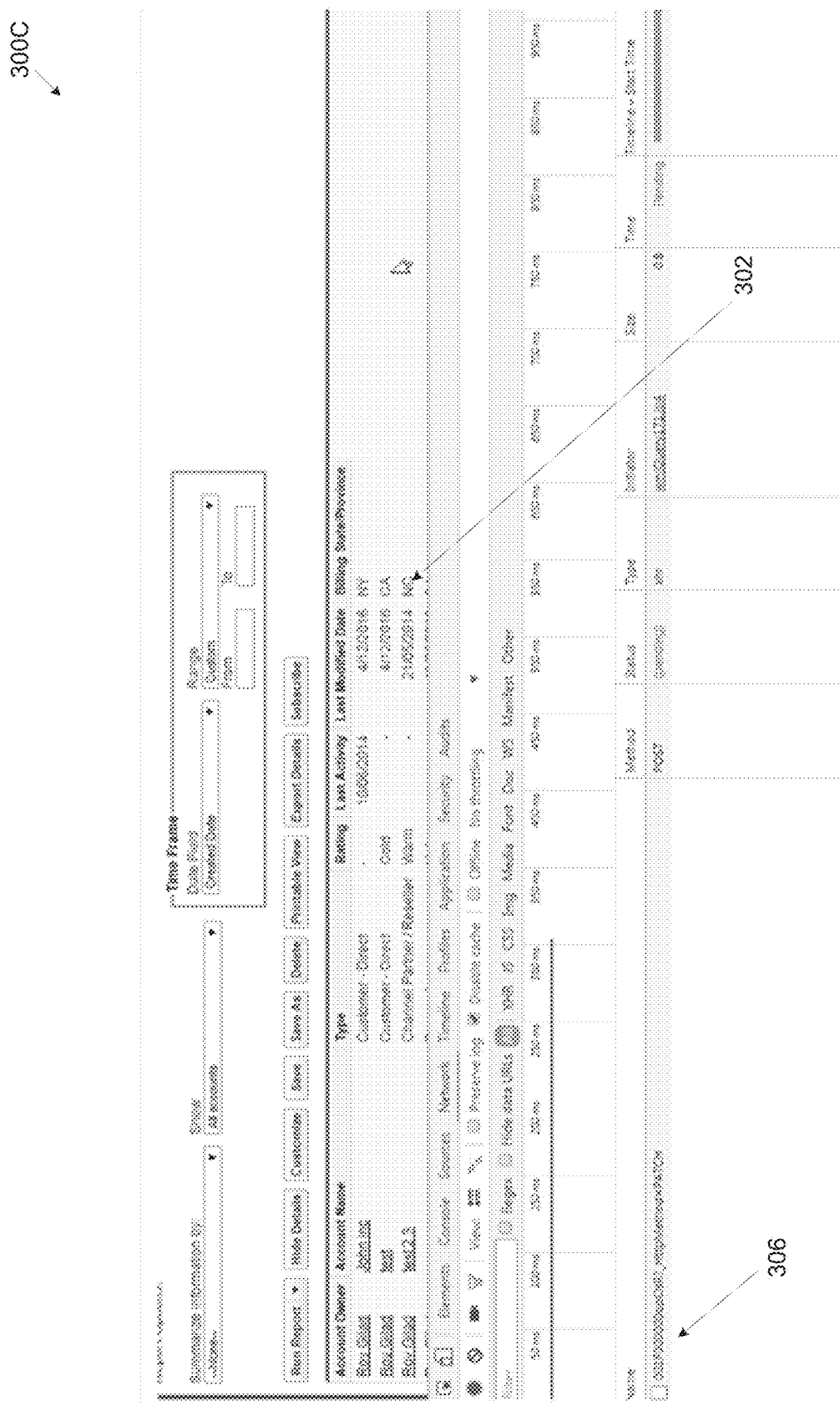

In the drawings:

FIG. 1 is a flowchart of an exemplary process for adjusting attributes of data records presented through GUI elements by an application, according to some embodiments of the present invention;

FIG. 2A, FIG. 2B and FIG. 2C are schematic illustrations of embodiments of an exemplary system for adjusting attributes of data records presented through GUI elements by an application, according to some embodiments of the present invention; and FIG. 3A, FIG. 3B and FIG. 3C are screen captures of an exemplary attribute adjustment of an attribute of data records presented through GUI elements by an application, according to some embodiments of the present invention.

DETAILED DESCRIPTION OF SPECIFIC EMBODIMENTS OF THE INVENTION

The present invention, in some embodiments thereof, relates to editing attributes of data records presented by an application page through GUI elements and, more particularly, but not exclusively, to editing attributes of data records presented by an application page through GUI elements by providing a quick edit tool.

According to some embodiments of the present invention, there are provided methods, systems and computer program products for quick editing values of one or more attributes of one or more data records presented as GUI elements in an application page (user context) to a user through a GUI of a client terminal. The application may be a local application locally executed by the client terminal or a remotely executed application executed by a web server (for example, a webpage, a web application and/or the like), that is accessed from the client terminal through an access tool (for example, a web browser, a local agent of a web application and/or the like). Similarly, the application page displaying the user context for interacting with the user may be, for example, the webpage, a screen of the web application, a screen of the local applications and/or the like. Most applications, in particular resources management applications, organization applications and/or the like, may typically present a high level view of a plurality of data records and/or parts thereof displayed as read-only GUI elements, i.e., the GUI elements are presented in non-editable areas of the user context. In order to perform one or more editing (manipulation) operations to one or more of the data records associated and/or presented through the GUI elements (for example, adjust a value of an attribute of a data record, delete a data record, duplicate a data record, add a data record and/or the like), the user typically needs to navigate to one or more edit pages of the application. The quick editing may allow editing the GUI element(s) directly from the application's read-only view in which the GUI element(s) are typically displayed in the non-editable area(s). The user context which is the content presented in the application page is first parsed to identify the GUI element(s) present in the user context. The identified GUI element(s) are further analyzed to identify one or more editing characteristics of a data record represented by each of the identified GUI elements, for example, whether the data record is editable, which of the data record's attribute(s) may be edited and what user access permission applies to each editing operation. Furthermore, the GUI elements presenting editable data records may be marked to indicate to the user which of the respective data records is editable.

In response to the user selecting one or more of the identified and editable GUI elements and based on the editing characteristics of the selected GUI element(s), including the access permission, an Editing GUI element user interface may be rendered in association with the selected GUI element(s) in the non-editable area. Through the editing GUI element, the user may perform one or more editing operations to update the data record(s) presented through the selected GUI element(s), for example, adjust one or more values of the attribute(s) of the data record(s) presented through the GUI element(s) in the non-editable area (read-only view) without navigating to the edit page(s) of the application. The editing operations may further include, for example, deleting one or more data records, duplicating one or more data records, adding one or more data records and/or the like.

The user input received from the user through the Editing GUI element is extracted and based on the user input the application is instructed to apply the update to the respective data record.

The quick editing may present significant advantages compared to traditional methods for editing attributes of the data records presented through the GUI elements. Since many applications, in particular the resource management applications, the organization applications and/or the like typically present a high level view of the plurality of GUI elements (data items) displayed in the non-editable areas of the user context, the user typically needs to navigate to one or more edit pages of the application in order to perform editing operations. This may be time consuming as the user may need to load a plurality of pages of the application and navigate through them in order to accomplish the editing operation(s). Moreover, the user may require an extended learning period to master the use of the application and get familiar with the various pages and navigation paths required to follow in order to perform the editing operations. The quick editing on the other hand is very intuitive as it provides an immediate user interface, i.e., the Editing GUI element, allowing the user to edit the editable GUI elements identified in the user context directly from the high level view (which is typically a non-editable area) of the application without leaving the page to navigate to the edit page(s) of the application. This may allow significant time saving and for manipulating the GUI elements presented by the application that may lead to increased user productivity. Furthermore, the quick editing may significantly reduce the application usage learning curve as the user may need to focus on learning using the high level page(s) of the application while avoiding the need to get familiar with a plurality of editing pages typically used for editing the GUI elements.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable medium may be a computer readable signal medium or a computer readable storage medium. Any combination of one or more computer readable medium(s) may be utilized. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA), may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Referring now to the drawings, FIG. 1 illustrates a flowchart of an exemplary process 100 for adjusting attributes of data records presented through GUI elements by an application, according to some embodiments of the present invention. The process 100 may be executed to edit values of one or more attributes of one or more data records presented through GUI elements in an application page (user context) displayed to a user through a GUI of a client terminal by a web browser, a local agent of a web application and/or an application locally executed by the client terminal. The application page displaying the user context for interacting with the user may be, for example, the webpage, a screen of the web application, a screen of the local applications and/or the like. The process 100 allows editing the attribute(s) directly in a current page in which the attributes may be displayed through the GUI in a non-editable area by analyzing the GUI element(s) and identifying editing characteristics of the underlying data records presented by the GUI elements. Based on the editing characteristics, an editing GUI element may be rendered in the non-editable area in response to a user selection to allow a user to perform one or more editing operations (for example, edit a value of the attribute(s), delete a data record, duplicate a data record, add a data record and/or the like). Using the Editing GUI element rendered in the non-editable area, the user may avoid the need to navigate to another page of the application in which the attribute(s) may be edited through an editable area. The user context (page content) of the page is first parsed and analyzed in order to identify one or more GUI elements (for example, a label, a text field, a button, a text area, a checkbox, a button, a drop-down list, a selection list, a panel and/or the like) displayed in the page in a non-editable area. Identifier information (for example, metadata) is then extracted and/or constructed for each of the data records presented through the identified GUI elements to describe the editable attributes associated with each data record. The identifier information may list one or more attributes for each data record including access permission information, for example, view, read, edit, delete, add and/or the like for the respective data record. In response to user interaction indicative of one or more of the identified GUI elements, the editing GUI element may be presented to the user in the non-editable area based in the identifier information to allow the user to edit the attribute(s) of the data record(s) indicated by the GUI element(s) without leaving the current page, i.e., without navigating to another page typically displayed for editing the attribute(s) values. The user input received through the Editing GUI element is then forwarded to the application to update the value(s) for the respective data record(s) stored, for example, in a database.

Naturally, the process 100 may be applied to adjusting attribute values for data records presented through the GUI elements by a plurality of applications. However, for brevity, the process 100 is described for a single application.

Reference is also made to FIG. 2A, FIG. 2B and FIG. 2C, which are schematic illustrations of embodiments of an exemplary system for adjusting attributes of data records presented through GUI elements by an application, according to some embodiments of the present invention. An exemplary system 200A for executing a direct adjustment process such as the process 100 comprises a client terminal 201, for example, a smartphone, a tablet, a smart watch, a laptop, a desktop, a work station and/or the like. The client terminal 201 may include a network interface 202, a processor(s) 204, a program store 206 and a user interface 208. The network interface 202 may provide one or more interfaces, wired and/or wireless for connecting to one or more networks 220, for example, a Local Area Network (LAN), a Wireless LAN (WLAN) (e.g. Wi-Fi), a cellular network interface and/or the like. The processor(s) 204, homogenous or heterogeneous, may be arranged for parallel processing, as clusters and/or as one or more multi core processor(s). The program store 206 may include one or more non-transitory persistent storage devices, for example, a flash array, a solid state drive (SSD) and/or the like. The program store 206 may further be utilized through one or more volatile memory devices (for example, a random access memory (RAM) device) used to store program code downloaded from one or more remote locations over the network interface 202 and/or from an external device (for example, a memory stick, a flash card and/or the like). The user interface 208 may include one or more human-machine interfaces (for example, a keyboard, a pointing device, a touch surface, a display, an audio interface and/or the like) for interacting with an associated one of a plurality of users 250. The user interface 208 may be used to present the user 250, for example, a graphic user interface (GUI) utilized through the human-machine interface(s).

The processor(s) 204 may execute one or more software modules, wherein a software module may be, for example, a process, a script, an application, an agent, a utility and/or the like, each comprising a plurality of program instructions stored in a non-transitory medium such as the program store 206 and executed by one or more processors such as the processor(s) 204.

The process 100 is directed to provide the user 250 with means to edit the value of one or more attributes of one or more data records presented through GUI elements by an application 210, for example, a webpage, a web application, a local application and/or the like.

In some embodiments of the present invention, as shown in the exemplary system 200A, the application 210 may be a webpage 210A hosted by a web server 230 (for example, a server, a cluster of processing nodes, a website server and/or the like). The web server 230 may be further utilized through, for example, a remote service, a cloud service, software as a service (SaaS), a platform as a service (PaaS) and/or the like. The processor(s) 204 communicating with the web server 230 over the network(s) 220 may execute a web browser 212A (for example, Chrome, Internet Explorer, Firefox, Edge, Safari, Opera and/or the like) for accessing the webpage 210A and rendering the content of the webpage 210 to the user 250. The web browser 212A renders the user context (content) of the webpage 210A for display to the user 250 through the GUI of the client terminal 201.

In some embodiments of the present invention, as shown in an exemplary system 200B, the application 210 may be a web application 210B executed by the web server 230. The processor(s) 204 communicating with the web server 230 over the network(s) 220 may execute a local agent 212B for communicating with the web application 210B and rendering the presentation generated by the web application 210B to the user 250. Optionally, the local agent 212B is utilized through the web browser 212A. The local agent 212B renders the user context (content) of the current page of the web application 210B for display to the user 250 through the GUI of the client terminal 201.

In some embodiments of the present invention, as shown in an exemplary system 200C, the application 210 may be a local application 210C locally executed by the processor(s) 204. The local application 210C may use the GUI of the client terminal 210 to display the user context presented of the current page of the application 210C to the user 250.

For brevity, hereinafter, unless specifically referenced, the webpage 210A, the web application 210B and/or the local application 210C are collectively referred to as the application 210.

The processor(s) 204 may execute a quick edit module 214 comprising one or more software modules for controlling the edit operations of one or more GUI elements presented by the application 210. The quick edit 214 is used to edit the value of one or more attributes of one or more of the data records presented through the GUI elements in a page, a screen, a window and/or the like of the application 210. However, it should be clear that in case the application 210 is remote as presented, for example, in the exemplary system 200A and/or 200B, the user context of the application 210 is displayed to the user 250 through a locally executed tool, for example, the web browser 212A and/or the local agent 212B. In such scenarios the quick edit module 214 may interact with the locally executed tool to instruct the remote server 230 to update the appropriate attribute(s) values for the application 210. For example, in the case of the webpage 210A, the quick edit module 214 may apply the edit operations through the web browser 212A. In another example, in case of the web application 210B, the quick edit module 214 may apply the edit operations through the local agent 212B. In another example, in case of the local application 210C, the quick edit module 214 may apply the edit operations directly to the local application 210C. However, additionally and/or alternatively, the quick edit module 214 may interact directly with the remote applications, for example, the webpage 210A and/or the web application 210B over the network(s) 220. In such case the quick edit module 214 may employ the API of the remote applications 210A and/or 210B for communicating with the remote application 210A and 210B respectively.

The quick edit module 214 may be utilized through one or more implementations, for example, a browser extension to the web browser 212A, a script embedded into the local agent 212B of the web application 210B, a software development kit (SDK) compiled into a mobile application such as the local application 210C, an SDK compiled into a desktop application such as the local application 210C and/or the like. Optionally, the quick edit module 214 is executed independently of the application 210 and interacts with the application 210 through an API provided by the application 210. The quick edit module 214 executed independently of the application 210 may also indirectly interact with the application 210 through one or more API functions the application 210 provides for data transfer with one or more of the users interfaces 208. Additionally and/or alternatively, the quick edit module 214 emulates user interaction of a user such as the user 250 through one or more of the user interfaces 208 to interact with the web browser 212A, the local agent 212B and/or the local application 210C. Furthermore, the quick edit module 214 may emulate the user interaction in a hidden session such that the interaction emulation is not visible to the user 250 on the GUI of the client terminal 201.

As shown at 102, the process 100 starts with the quick edit module 214 parsing a current page displayed by the application 210 to the user 250 through a GUI of the client terminal 201 to identify one or more GUI elements displayed in the page. In particular, the quick edit 214 may parse the page to identify one or more data records having one or more attribute(s) that are presented through the identified GUI elements in non-editable areas such that the user 250 cannot edit the attribute(s) in the current page. As discussed before, the page may be displayed directly by the application 210 as in the case of the local application 210C, however as in case of the remote applications 210A and/or 210B executed by the web server 230, the page of the application 210 may be rendered by a local tool (for example, the web browser 212A and/or the local agent 212B). Every time a new page of the application 210 is loaded, the quick edit module 214 parses the user context of the page, i.e., the visual contents of the page to identify one or more of the GUI elements displayed in the page, for example, a label, a text field, a button, a text area, a text box, a checkbox, a button, a drop-down list, a selection list, a panel and/or the like.

The quick edit module 214 may use the API of the web browser 212A, the local agent 212B and/or the local application 210C to extract the user context presented by the application 210 and analyze the user context to identify the GUI element(s) displayed in the page. Additionally and/or alternatively, the quick edit module 214 may use the API of the webpage 210A and/or the web application 212B to communicate directly with the server 230 hosting the webpage 210A and/or the web application 212B respectively rather than with the web browser 212A, the local agent 212B respectively. For example, based on the information retrieved from the application 210 through the API, the quick edit 214 may extract identification (ID) of the user context displayed in the page and extract the GUI element(s) of the page according to pre-defined patterns associated with the extracted user context ID. The quick edit module 214 may further apply one or more image processing techniques and/or algorithms for pattern recognition to identify one or more characteristics of the user context (for example, a title, a layout, an ID string, an ID symbol, a Uniform Resource Locator (URL) string and/or the like). The quick edit module 214 may compare the recognized patterns to pre-defined characteristics assigned to each page (user context) to identify the user context associated with the current page. For example, based on the pattern recognition, the quick edit module 214 may identify a pre-defined table structure in the displayed user context and based on the (known) characteristics of the pre-defined table structure, the quick edit module 214 may extract the GUI element(s) included in the table structure.

As shown at 104, the quick edit module 214 extracts and/or constructs identifier information for each data record associated with each of the identified GUI element(s) (for example, a metadata record associated with each data record). The identifier information includes, for example, a type of the data record, a name of the data record, a label of the data record and/or the like. In addition, the identifier information may describe one or more attributes (data fields) of the data record associated with the identified GUI element where one or more of the attributes may be assigned with a value. The data record may be stored, for example, in a database of the web server 230, in a data base in the local storage 206 and/or the like. The quick edit module 214 constructs the identifier information to detail whether the respective data records may be edited by the user 250 or not.

The identifier information may further include access permission information, for example, view, read, edit and/or the like for each of the data records associated with the identified GUI element. The access permission information may specify access rights for the user 250 to perform one or more of the editing operations, for example, delete, add and/or duplicate the respective data record.

The quick edit module 214 may extract the identifier information according to pre-defined identifier information assigned to the identified GUI element. For example, based on the identified GUI element's ID, type, name, label and/or the like, the quick edit module 214 may retrieve a pre-defined attribute list for the data record associated with the identified GUI element. The quick edit module 214 may further use the API of the application 210 to extract the identifier information. Naturally, in case of the remote applications 210 such as, for example, the webpage 210A and/or the web application 210B, the quick edit module 214 may interact with the web browser 212A and/or the local agent 212B serving as the access tools for the application 210 to extract the identifier information.

Additionally and/or alternatively, the quick edit module 214 may extract the identifier information by interacting with the application 210 through one or more sessions initiated using one or more user interfaces of the application 210 to emulate user interaction of a user such as the user 210. Again, in case of the remote applications 210 such as, for example, the webpage 210A and/or the web application 210B, the quick edit module 214 emulate the interaction of the user 250 with the local access tool(s) such as, for example, the web browser 212A and/or the local agent 212B to access the webpage 210A and/or the web application 210B. For example, in case the quick edit module 214 identifies one or more GUI elements in the page, the quick edit module 214 may open one or more additional sessions associated with the identified GUI element(s) (for example, a new navigation window with the web browser 212A). In the new navigation window, the quick edit module 214 may navigate to one or more additional pages of the application 210 in which the attributes of the respective data record(s) presented through the identified GUI element(s) may be edited in order to explore the attributes, in particular the editing characteristics of the attribute(s). For example, assuming the quick edit module 214 identifies a table field GUI element presenting a value of a certain attribute of a certain data record is displayed in a non-editable (view only) area in the current page of the application 210 rendered by the web browser 212A. The quick edit module 214 may open another navigation window to enter a page of the application 210 in which the certain attribute and/or the certain data record may typically be edited. The quick edit module 214 may identify the certain attribute and optionally additional attribute(s) of the certain data record in the editable page and construct the identifier information for the certain data record and the identified attribute(s). Optionally, the quick edit module 214 initiates one or more of the additional session(s) to extract the identifier information in a hidden area of the GUI such that the session(s), i.e., the additional interaction window(s) are not visible to the user 250.

The quick edit module 214 may assign for one or more of the identified GUI elements an event handler associated with a user interaction of the user 250 for selecting the respective GUI element(s). The user interaction may include, for example, a double click of the pointing device left button, a single click of the pointing device right button, a single click of the pointing device left button, a hover of the pointing device cursor, a multi-touch on a touch screen and/or the like. The assigned event handler may later be invoked for editing the respective GUI element(s) in response to the associated user interaction.

Optionally, the quick edit module 214 marks one or more of the identified GUI elements that present data records and/or attribute(s) that may be edited in order to indicate to the user 250 which of the identified GUI elements are editable. For example, the quick edit module 214 may highlight with a certain color each of the identified GUI elements that may be edited.

Optionally, the quick edit module 214 marks one or more of the identified GUI elements in case the value of one or more of the attributes comply with one or more conditional rules, for example, exceed a pre-defined value, equal a certain value and/or the like. For example, assuming the GUI elements are table entries presenting data records, each of the data records may have an employee name attribute to associate the data record with one of the employees associated and an attribute specifying a weekly working hours summary for the associated employee. The quick edit module 214 may mark (for example, highlight with a color, underline and/or the like) table entry GUI element(s) in which the weekly working hours summary attribute has a value that is below a pre-defined minimum weekly working hours value. In another example, the quick edit module 214 may mark table entry GUI element(s) in which the weekly working hours summary attribute has the same value (for example, 45 hours). In another example, the conditional rule may be the employee name attribute such that the quick edit module 214 may mark, for example, any of the table entry GUI element(s) in which the employee name attribute has a value of a name starting with the same letter (for example, A).

As shown at 106, the quick edit module 214 identifies (detects) one or more of the user interactions indicative of one or more of the GUI elements the user 250 selects to edit. The quick edit module 214 may identify the user interaction by interacting with the application 210 through the provided API of the application 210 or the web browser 212A and/or the local agent 212B in case of the remote applications 210. The quick edit module 214 may also identify the user interaction by monitoring the user interface 208, for example, a pointing device, a keyboard, a touch screen and/or the like while the user 250 interacts with the application 210. The quick edit module 214 may further detect the user interaction by attaching to system calls, processes and/or hooks provided by, for example, an operating system (OS) for monitoring the user interaction.

As shown at 108, based on the identifier information constructed for the data record comprising the attribute(s) presented by the GUI element(s) selected by the user 250, the quick edit module 214 may render, in the read-only area of the current page, an editing GUI element associated with one or more of the selected GUI element(s). This may allow the user 250 to edit the data record(s) attribute(s) value presented through the selected GUI element(s) directly in the current page without navigating to one or more editing pages in which the data record(s) may typically be edited. Before rendering the editing GUI element, the quick edit module 214 may check a privilege value of the access permission attribute for the data record associated with the selected GUI element(s) to verify the user 250 is privileged for editing the data record(s). The quick edit module 214 may render the editing GUI element in case the user 250 is privileged for editing the data record(s).

The quick edit module 214 may render the editing GUI element in a plurality of implementations, for example, an alteration of the selected GUI element, an additional GUI element and/or the like. For example, in case the selected GUI element is a non-editable text field GUI element, the quick edit module 214 may render a text box editing GUI element over or instead of the text field GUI element to allow the user 250 to insert text for updating the value of one or more of the attributes presented through the selected GUI element.

The editing GUI element may allow the user 250 to take one or more editing operations with respect to the data record presented by the selected GUI element(s), for example, edit the value of one or more of the attributes, add a data record, remove a data record, delete a data record, duplicate a data record, create a new data record and/or the like.

For example, in order to allow the user 250 to adjust the value of a certain attribute presented through a certain selected GUI elements, the quick edit module 214 may render the editing GUI element as the text box over the certain selected GUI such that the user 250 may insert text to adjust the value of the certain attribute. Optionally, the quick edit module 214 configures the editing GUI element to identify the attribute for which the value is adjusted. The editing GUI element may include, for example, a text, a symbol and/or a sign to identify to the user 250 the attribute that is currently adjusted.

Optionally, the quick edit module 214 auto-completes text inserted by the user 250 in a text input editing GUI element. The quick edit module 214 may auto-complete text according to identical text detected for the identified GUI element(s) in the user context (page content). For example, in case the user 250 inserts text in an editing GUI element rendered by the quick edit module 214 for a table GUI element identified in the user context, the quick edit module 214 may suggest auto-completion with text alternatives found in entries of the table GUI element. For example, assuming the table GUI element contains names of employees of a company such as, for example, "john doe", "John Adams", "George Washington", "Thomas Jefferson", "James Madison", "James Monroe", "John Quincy Adams" and/or the like. In case the quick edit module 214 identifies the user 250 types in the editing GUI element the letters "Joh", the quick edit module 214 may suggest auto-completion with the alternatives of "john doe", "John Adams", "John Quincy Adams" that the user 250 may select. The quick edit module 214 may further suggest auto-completion for text inserted by the user 250 in the editing GUI element according to similar (but not identical) text detected for the identified GUI element(s) in the user context (page content). The quick edit module 214 may apply one or more bucketing models to classify and/or group the identified GUI elements based on their text similarities. The quick edit module 214 may then suggest the user 250 with auto-complete alternatives according to similarity of the text inserted by the user 250 to the editing GUI element. The user 250 may select one or more of the suggested alternatives.

In another example, the quick edit module 214 may allow the user 250 to delete one or data records presented through the selected GUI element(s). The quick edit module 214 may render the editing GUI element with a delete field, for example, an action bar with an icon for deleting the data record(s).

In another example, the quick edit module 214 may allow the user 250 to duplicate (clone) one or more data records presented through the selected GUI element(s). The quick edit module 214 may render the editing GUI element with a duplicate field, for example, an action bar with an icon for duplicating the data record(s).

In another example, the quick edit module 214 may allow the user 250 to add one or more data records similar to the data record(s) presented through the selected GUI element(s). The quick edit module 214 may render the editing GUI element with an add field, for example, an action bar with an icon for adding the data record(s).

Optionally, the quick edit module 214 allows the user 250 to edit a plurality of data records associated with a plurality of GUI elements in a single interaction session and/or through a single editing GUI element. For example, assuming the user 250 selects a plurality of table entry GUI elements of a table each presenting a respective data record, the quick edit module 214 may render the editing GUI element to allow the user to select multiple GUI elements for editing. The quick edit module 214 may render the editing GUI element with multiple fields each configured to accept a value for a corresponding one of the data records. In another implementation, the quick edit module 214 may render a specific editing GUI element for each of the selected table entry GUI elements.

Optionally, the quick edit module 214 presents additional information for data record(s) associated with one or more of the selected GUI element(s). For example, assuming one of the attributes of the a certain data record is a link to a certain webpage, in response to the user selection of the user 250, for example, a hover of the pointing device curser over the selected GUI element, the quick edit module 214 may render an editing GUI element that presents the value of the link attribute, for example, the URL of a certain webpage. The quick edit module 214 may further monitor interaction of the user 250 with the presented link, for example, a right click of the pointing device on the link attribute presented in the editing GUI element to open the pointed specific webpage (according to the URL) in a window of a web browser such as the web browser 212A.

Reference is now made to FIG. 3A and FIG. 3B, which are screen captures of an exemplary attribute adjustment of data records presented through GUI elements by an application, according to some embodiments of the present invention. A screen capture 300A presents an exemplary screen capture of an application, for example, a webpage such as the webpage 210A rendered by a web browser such as the web browser 212A. An exemplary GUI element 302 presenting a data record having an attribute of "Billing State/Province" is set with a value "–", i.e. no value is assigned to the "Billing State/Province" attribute. The screen capture 300A presents a status view and as such the data records presented through the GUI elements, for example, the GUI element 302 are displayed in non-editable areas. As shown in a screen capture 300B, a user such as the user 250 indicates selection of the GUI element 302, for example, by double clicking the pointing device left button over the GUI element 302. In response to the selection indication of the user 250, a quick edit module such as the quick edit module 214 renders an editing GUI element 304 in the location of the GUI element 302. As described before, the quick edit module 214 renders the editing GUI element 304 after verifying that the data record presented through the GUI element 302 may be edited and that the user 250 has access permission to edit the data record. Using the editing GUI element 304, the user 250 may edit, for example, adjust the value of the "Billing State/Province" attribute presented through GUI element 302 in the current webpage without navigating to another page(s) for editing the data record associated with the GUI element 302.

Reference is made once again to FIG. 1, FIG. 2A, FIG. 2B and FIG. 2C. As shown at 110, the quick edit module 214 extracts the user input inserted by the user 250 through the editing GUI element. The user input may be, for example, a text string inserted through a text box editing GUI element, a checkbox selection through a checkbox editing GUI element, selection of an action (e.g. delete, add, duplicate, etc.) from an action bar editing GUI element and/or the like.

As shown at 112, the quick edit module 214 instructs the application 210 to update the data record(s) presented through the select GUI element(s) according to the user input extracted from the editing GUI element. In case of the local application 210C, the quick edit module 214 may interact with the local application 210C to instruct the adjustment of the attribute(s) and/or the manipulation (e.g. add, delete, duplicate) of the data associated with the selected GUI element according to the user input. In case of the remote applications such as the webpage 210A and/or the web application 210B, the quick edit module 214 may interact with the local tool, for example, the web browser 212A and/or the local agent 212B to forward the update instructions to the webpage 210A and/or the web application 210B. Additionally and/or alternatively, the quick edit module 214 may directly interact with the remote application 210, for example, the webpage 210A and/or the web application 210B over the network 220. Upon reception of the update instructions, the application 210 may update the data record(s) with the value of the attribute(s) presented through the selected GUI element(s). For example, the application 210, in particular the webpage 210A and/or the web application 210B may update the data record(s) in the database at the web server 230.

The quick edit module 214 may forward the update instructions to the application 210 through the API provided by the application 210C and/or through the API of the local access tools such as the web browser 212A and/or the local agent 212B in case the update instructions are forwarded to the remote applications such as the webpage 210A and/or the web application 210B.

Additionally and/or alternatively, the quick edit module 214 may interact with the application 210 through one or more sessions initiated using one or more user interfaces of the application 210 to emulate user interaction of a user such as the user 210. In case of the remote applications such as the web browser 212A and/or the local agent 212B, the quick edit module 214 may interact with the access tool(s) such as the web browser 212A and/or the local agent 212B to forward the update instructions to the webpage 210A and/or the web application 210B. For example, assuming according to the user input, the user 250 selects to edit (adjust) a value of a certain attribute presented through a table field GUI element, the quick edit module 214 may open one or more update sessions for updating the value of the certain attribute according to the user input. For example, the quick edit module 214 may launch a new navigation window of the web browser 212A to navigate to an update page in which the application 210 enables editing of a value of the certain attribute presented through, for example, a table entry GUI element. In the appropriate editable area associated with the certain attribute presented through the table entry GUI element, the quick edit module 214 may update the value of the certain attribute according to the extracted user input received from the user 250. Optionally, the quick edit module 214 initiates one or more of the additional session(s) in a hidden area of the GUI such that the update session(s), i.e. the additional interaction window(s) are not visible to the user 250.

Optionally, the quick edit module 214 presents an editing operation completion after instructing the application 210 to adjust the value of the attribute(s) according to the user input in order to indicate to the user 250 that the editing operation is completed. For example, during the editing operation by the user 250, the background of the editing GUI element may be colored in a different color than the original color of the selected (edited) GUI element. Upon completion of the editing operation, the quick edit module 214 may resume the background color of the selected GUI element(s) to the original color. In another example, the editing GUI element includes a text box with a blinking cursor. Upon completion of the editing operation, the quick edit module 214 may remove the editing GUI element and the blinking cursor such that the selected GUI element(s) resume their original appearance.

Optionally, the quick edit module 214 maintains an editing event log for recording the edit operations made to the GUI elements. The quick edit module 214 may further maintain the editing event log according to one or more editing parameters, for example, edit operations initiated by a specific user 250, edit operations initiated by the specific user 250 during a specific session, edit operations initiated by a plurality of users such as the user 250 of a certain company, edit operations per GUI element and/or the like. The quick edit module 214 may store the value of the attribute(s) as set prior to the editing operation and the value set for of the attribute(s) following the editing operation. The quick edit module 214 may present the event log to the user 250 during the session the user 250 holds with the application 210. The quick edit module 214 may further allow the user 250 to restore the value of the adjusted attribute(s) to its value as stored prior to the editing operation. To achieve this, the quick edit module 214 may render the editing GUI element with a restore field, for example, an action bar with an icon for "undo" (restore) action to allow the user 250 to restore the value of one or more of the edited attributes. The depth of the restore pipe may be pre-defined and/or set for each session of the user 250 with the application 210. In case the user 250 deleted, added and/or duplicated data records, in response to selection of the restore action, the edit module 214 may restore the situation of the data records as it was prior to the editing operation. The editing event log may be stored for further analysis to identify one or more data manipulation patterns of the user 250 and/or the plurality of users 250 manipulating the GUI elements identified in the user context.

Optionally, the quick edit module 214 maintains time saver log for the edit operations made for one or more of the GUI elements identified in the user context. The quick edit module 214 may log edit operations that are made by the standard method of navigating to the page in which the GUI element(s) are editable. The quick edit module 214 may record the time interval of the standard edit operation made by one or more users 250 for one or more of the GUI elements identified in the user context. The quick edit module 214 may further maintain the timer saver log according to one or more of the editing parameters, for example, edit operations initiated by a specific user 250, edit operations initiated by the specific user 250 during a specific session, edit operations initiated by the plurality of users 250 of a certain company, edit operations per GUI element and/or the like. Based on the recorded time intervals required for editing the GUI element(s) in the standard method, the quick edit module 214 may analyze the edit operations, in particular the edit operations logged in the editing event log to evaluate the time saved by using the quick edit module 214 for editing the GUI element(s) instead of using the standard edit method. The analysis and evaluation may be used to calculate an approximate time saved by using the quick edit module 214 to estimate a plurality of productivity parameters of the user 250.

Reference is now made to FIG. 3C, which is a screen capture of an exemplary attribute adjustment of data records presented through GUI elements by an application, according to some embodiments of the present invention. Continuing the example presented in the screen captures 300A and 300B, a screen capture 300C presents the updated value "NC" assigned to the attribute "Billing State/Province" of the data record presented through the GUI element 302. The value "NC" is assigned by the application 210 to the "Billing State/Province" attribute following reception of the respective update instructions from a quick edit module such as the quick edit module 214. The quick edit module 214 forwards the respective update instructions to the application 210 after extracting the user input inserted by a user such as the user 250 through the editing GUI element 304 as shown in screen capture 300B. As seen in the screen capture 300C, after instructing the application 210 to apply the respective update instructions for updating the value of the "Billing State/Province" attribute of the data record associated with the GUI element 302 with the value "NC", the quick edit module 214 removes the editing GUI element 304 to indicate to the user 250 that the edit operation is completed successfully. As seen in the screen capture 300C, the quick edit module 214 issues an update request 306 through the web browser 212A to instruct the web server 210A to update the value "NC" for the "Billing State/Province" attribute of the data record associated with the GUI element 302.

It is expected that during the life of a patent maturing from this application many relevant systems, methods and computer programs will be developed and the scope of the term, client terminal user interfaces is intended to include all such new technologies a priori.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

What is claimed is:

1. A method comprising:
   obtaining, at a client terminal, a webpage of a website served by a server to be presented to a user via a web browser, wherein the website comprises the webpage and an edit page that is navigable from the webpage, wherein the website is associated to a data record comprising one or more attributes having one or more corresponding values, wherein the one or more corresponding values are presented for a read-only view of a non-editable are of the webpage and are presented for editing in an editable area of the edit page, wherein the website is configured to enable editing of the one or more corresponding values at the edit page, wherein the website is not configured to enable any client to edit the one or more corresponding values at the webpage, wherein the edit page and the webpage are different pages of the website, wherein the webpage defines a non-editable GUI element for displaying a value of an attribute of the one or more attributes in the data record, wherein the non-editable GUI element is presented in the non-editable area of the webpage;
   analyzing, at the client terminal, a content of the non-editable area of the webpage to identify the non-editable GUI element in the non-editable area;
   based on said analyzing, extracting identifier information of the non-editable GUI element, wherein the non-editable GUI element is configured to display the value of the attribute of the data record based on an extraction of the data record from a database according to the identifier information;
   in response to identifying, at the client terminal, that the user selected the non-editable GUI element in the non-editable area of the webpage, rendering, by a software module that is independent from the webpage and the web browser, an editing GUI element for editing the value without manually navigating to the edit page, wherein the editing GUI element is rendered in a location of the non-editable GUI element, whereby rendering the editing GUI element over the non-editable GUI element;
   extracting a user input received from the user using the editing GUI element; and
   forwarding to a server, instructions to update the value in the data record, according to the user input as received from the user through the editing GUI element, whereby enabling the user to update the data record without manually navigating to the edit page.

2. The method of claim 1, wherein the identifier information is extracted using an Application Programming Interface (API) of the web browser.

3. The method of claim 1, wherein the identifier information is extracted by rendering at least one other webpage loaded invisibly to the user on the web browser.

4. The method of claim 1, wherein the editing GUI element is not defined by the webpage.

5. The method of claim 1, wherein a type of the editing GUI element is selected based on characteristics of the non-editable GUI element, wherein the editing GUI element is rendered according to a permission attribute value of the user indicating an access privilege value for the attribute.

6. The method of claim 1, wherein the instructions are forwarded to the server using an Application Programming Interface (API) of the web browser.

7. The method of claim 1, wherein the instructions are forwarded to the server by navigating automatically to the edit page and updating the value in the edit page according to the user input, wherein the edit page is loaded invisibly to the user on the web browser.

8. The method of claim 1, wherein the non-editable GUI element is marked to indicate to the user that the attribute is editable based on said analyzing, wherein the marking is rendered by the software module that is independent from the webpage and the web browser.

9. The method of claim 1, further comprising autocompleting a text inserted by the user using the editing GUI element.

10. The method of claim 1, further comprising presenting a completion indication to the user after the instructions are forwarded to the server.

11. The method of claim 1, further comprising marking the non-editable GUI element in case the value of the attribute complies with at least one conditional rule.

12. The method of claim 1, further comprises rendering the editing GUI element to receive the user input for editing the value of the attribute for multiple data records including the data record presented by the non-editable GUI element in the webpage.

13. The method of claim 1, wherein the editing GUI element further comprising a restore field for restoring the value of the attribute to the value as set prior to extracting the user input using the editing GUI element, wherein the value as set prior to the editing GUI element is stored in an event log.

14. The method of claim 1, wherein the editing GUI element further comprising a delete field for deleting the data record in case the identifier information identifies the data record as allowed for deletion.

15. The method of claim 1, wherein the editing GUI element further comprising a duplicate field for duplicating the data record in case the identifier information identifies the data record as allowed for duplication.

16. The method of claim 1, wherein the editing GUI element further comprising an add field for adding a new data record such as the data record in case the identifier information identifies that the new data record is allowed to be added.

17. The method of claim 1, wherein the editing GUI element further comprising presenting additional information for the data record in response to at least one additional action by the user.

18. An apparatus for editing attributes of data records presented through GUI elements by a webpage of a website, wherein the website comprises the webpage and an edit page that is navigable from the webpage, wherein the website is associated to the data records, wherein one or more values of the attributes of the data records are presented for a read-only view in a non-editable area of the webpage and are presented for editing in an editable area of the edit page, wherein the website is configured to enable editing of the one or more values at the edit page, wherein the website is not configured to enable any client to edit the one or more values at the webpage, wherein the edit page and the webpage are different pages of the website, the apparatus comprising:
  at least one processor of a client terminal, which is configured for hosting a web browser;
  a network interface for enabling connection to a server hosting the website, wherein the network interface is configured to obtain the webpage from the server, wherein the webpage defines a non-editable GUI element for displaying a value of an attribute of the one ore more attributes in a data record, wherein the non-editable GUI element is presented in the non-editable area of the webpage; and
  a program store configured to store program code for execution by said at least one processor, said program code comprising:
    code instructions to analyze a content of the webpage to identify the non-editable GUI element;
    code instructions to extract, based on the analysis of the content of the webpage, identifier information of the non-editable GUI element, wherein the non-editable GUI element is configured to display the value of the attribute of the data record based on an extraction of the data record from a database according to the identifier information;
    code instructions to identify that a user selected the non-editable GUI element in the non-editable area of the webpage, and in response to identifying the user selection, to: render an editing GUI element for editing the value without manually navigating to the edit page, wherein the editing GUI element is rendered in a location of the non-editable GUI element, whereby rendering the editing GUI element over the non-editable GUI element;
    code instructions to extract a user input received from the user using the editing GUI element; and
    code instructions to automatically emulate a user interaction with the web browser according to the user input as received from the user through the editing GUI element, wherein the user interaction that is automatically emulated comprises navigating to the edit page and utilizing the user input to update the value of the attribute through the edit page, whereby enabling the user to update the data record without manually navigating to the edit page.

19. A computer program product, comprising a non-transitory computer-readable medium in which program code is stored for execution by a computer, said program code comprising code instructions to:
  obtain, at a client terminal, a webpage of a website served by a server to be presented to a user via a web browser, wherein the website comprises the webpage and an edit page that is navigable from the webpage, wherein the website is associated to a data record comprising one or more attributes having one or more corresponding values, wherein the one ore more corresponding values are presented for a read-only view in a non-editable area of the webpage and are presented for editing in an editable area of the edit page, wherein the website is configured to enable editing of the one or more corresponding values at the edit page, wherein the website is not configured to enable any client to edit the one ore more corresponding values at the webpage, wherein the edit page and the webpage are different pages of the website, wherein the webpage defines a non-editable GUI element for displaying a value of an attribute of the one or more attributes in the data record, wherein the non-editable GUI element is presented in the non-editable area of the webpage;
  analyze, at the client terminal, a content of the webpage to identify the non-editable GUI element;
  based on the analysis, extract identifier information of the attribute of the data;
  identify that the user selected the non-editable GUI element, and in response to the identification render, by a software module that is independent from the webpage and the web browser, an editing GUI element for editing the value without manually navigating to the edit page, wherein the editing GUI element is rendered in a location of the non-editable GUI element, whereby rendering the editing GUI element over the non-editable GUI element;
  extract a user input received from the user using the editing GUI element; and automatically emulate a user interaction with the web browser according to the user input as received from the user through the editing GUI element, wherein the user interaction that is automatically emulated comprises navigating to the edit page and utilizing the user input to perform an edit of the value of the attribute through the edit page, whereby enabling the user to update the data record without manually navigating to the edit page.

20. A method of editing attributed of the data records presented through GUI elements displayed by an application page of an application, wherein the application comprises the application page and an edit page that is navigable from the application page, wherein the application is associated to a data record comprising one or more attributes having one or more corresponding values, wherein the one ore more corresponding values are presented for a read-only view in a non-editable area of the application page and are presented for editing an editable area of the edit page, wherein the application is configured to enable editing of the one or more corresponding values at the edit page, wherein the application is not configured to enable any client to edit the one or more corresponding values at the application page, wherein the edit page and the application page are different pages of the application, the method comprising:

analyzing a content of the application page to identify a non-editable GUI element presented in the non-editable area of the application page, wherein the application defines the non-editable GUI element for displaying a value of an attribute of the one or more attributes in the data record, wherein the non-editable GUI element is presented in the non-editable area of the application page;

based on said analyzing, extracting identifier information of the non-editable GUI element, wherein the non-editable GUI element is configured to display the value of the attribute of the data record based on an extraction from a database according to the identifier information;

in response to identifying that a user selected the non-editable GUI element in the non-editable area of the application page, rendering, by a software module that is independent from the application, an editing GUI element for editing the value without manually navigating to the edit page, wherein the editing GUI element is rendered in a location of the non-editable GUI element, whereby rendering the editing GUI element over the non-editable GUI element;

extracting a user input received from the user using the editing GUI element; and instructing the application to update the value in the data record according to the user input as received from the user through using the editing GUI element, whereby enabling the user to update the data record from the application page and without using manually navigating to the edit page.

21. The method of claim 20, wherein the application is a member of a group consisting of: a local application executed by said client terminal and a web application executed by a remote server accessible from said client terminal over at least one network.

* * * * *